United States Patent [19]
Ruddy et al.

[11] Patent Number: 5,969,359
[45] Date of Patent: Oct. 19, 1999

[54] MONITORING OF NEUTRON AND GAMMA RADIATION

[75] Inventors: Francis Henry Ruddy, Monroeville; Abdul Raheem Dulloo, Pittsburgh; Thomas Vincent Congedo, Pittsburgh; John George Seidel, Pittsburgh, all of Pa.

[73] Assignee: Westinghouse Electric Company, Pittsburgh, Pa.

[21] Appl. No.: 08/851,237

[22] Filed: May 5, 1997

Related U.S. Application Data

[60] Provisional application No. 60/027,068, Sep. 30, 1996.

[51] Int. Cl.$^6$ .......................... G21C 17/02; G21C 17/06; G01T 3/08
[52] U.S. Cl. ................ 250/370.05; 250/370.06; 250/370.13
[58] Field of Search .................. 250/370.05, 370.06, 250/370.13

[56] References Cited

U.S. PATENT DOCUMENTS

| | | |
|---|---|---|
| 3,227,876 | 1/1966 | Ross . |
| 3,805,078 | 4/1974 | Kozlov . |
| 3,832,668 | 8/1974 | Berman . |
| 4,267,454 | 5/1981 | Playfoot et al. . |
| 4,284,893 | 8/1981 | Allan et al. . |
| 4,419,578 | 12/1983 | Kress . |
| 5,216,249 | 6/1993 | Jones et al. .......................... 250/370.05 |
| 5,378,921 | 1/1995 | Ueda . |
| 5,574,758 | 11/1996 | Murakami et al. ...................... 376/245 |
| 5,659,177 | 8/1997 | Schulte et al. ...................... 250/390.12 |
| 5,726,453 | 3/1998 | Lott et al. .......................... 250/390.01 |

*Primary Examiner*—Constantine Hannaher
*Assistant Examiner*—Andrew Israel

[57] ABSTRACT

An improved method and apparatus for performing measurements related to spent nuclear fuel burnup is disclosed. The use of temperature- and radiation-resistant semiconductor detectors permits simultaneous monitoring of neutron and gamma ray emission rates from spent fuel, as well as providing axial burnup gradient information. The semiconductor detectors preferably comprise SiC. The method and apparatus provide significant cost reductions, lowered radiation exposures and increased operational safety during spent fuel monitoring operations.

50 Claims, 9 Drawing Sheets

MONITORING OF NEUTRON AND GAMMA RADIATION

CROSS-REFERENCE TO RELATED APPLICATION

This application claims the benefit of Provisional Application Ser. No. 60/027,068 filed Sep. 30, 1996.

FIELD OF THE INVENTION

The present invention relates to the detection of neutron and gamma emissions, and more particularly relates to a method and apparatus for measuring neutron and gamma emissions from sources such as spent nuclear fuel.

BACKGROUND INFORMATION

Transportation and shipment of spent nuclear fuel for eventual disposal is regulated by the Nuclear Regulatory Commission (NRC) through the requirements of Title 10 of the Code of Federal Regulations, Part 71. To meet the requirements of 10 CFR § 71, transportation casks must be designed to ensure criticality safety. The safety analyses for these transportation casks are presently based on the assumption that the fuel assemblies are unirradiated, i.e., the fissile content is the same as for the as-manufactured assembly. This assumption is conservative in the spent nuclear fuel case, as the fissile isotopes have been burned up as a result of the use of the fuel assembly in a reactor and, therefore, the fissile isotope content of the assembly is much lower than the as-manufactured content.

The capacity of transportation casks can be severely limited by the "fresh fuel" assumption, as larger criticality safety margins exist in the spent fuel assembly case. If credit could be taken for the burnup of the assemblies, cost savings in the transportation of spent fuel assemblies would result. In the development of canisters in support of dry storage of spent nuclear fuel, approval is currently being sought for a burnup credit methodology in support of package loading. The burnup credit methodology will rely on a combination of calculated burnup using reactor records, and burnup verification measurements to verify reactor records.

With increasing emphasis on issues related to the shipment of fuel for eventual disposition, burnup verification measurements and methodology are assuming a role of greater importance. The "fresh fuel" assumption results in very conservative designs for spent fuel racks, shipping canisters and waste repository storage. These overly conservative designs result in increased costs for the storage and shipping of spent nuclear fuel.

In order to take advantage of burnup credit for spent nuclear fuel, a method must be in place to reliably verify the fissionable content of fuel assemblies to ensure that criticality safety limits are not exceeded. Typical burnup verification methods require measurements of fuel assemblies to confirm reactor records of initial enrichment, burnup and decay time. These measurements rely on determining the neutron flux and, in some cases, the gamma dose in the vicinity of the fuel centerline.

The measurement technology in presently available commercial systems relies on $^{235}$U fission chambers to measure the neutron specific activity and either gamma ionization chambers, gamma scintillation detectors or solid-state semiconductor detectors (high-purity germanium HPGe), to detect gamma rays. Fission chambers and gamma ionization chambers are rather large gas-filled detectors. NaI(Tl) scintillation gamma ray detectors are typically large and require a photomultiplier tube and gamma ray shielding for operation in a spent fuel environment. HPGe gamma ray detectors require a liquid nitrogen cryogenic system or an electronic cooling system, since they are not capable of operation as high-resolution gamma ray detectors at higher temperatures. These detectors are sensitive to environmental factors such as temperature and the intense, mixed gamma ray and neutron field. For example, fission chambers are sensitive to gamma ray background, and gamma ionization chambers, NaI(Tl) detectors and HPGe detectors are all sensitive to neutron-induced background.

During the course of the use of a fuel assembly in a reactor core, higher actinides are produced by a chain of neutron captures followed by beta decay. In uranium fuel, the higher-actinide buildup chain originates with the $^{238}$U present in the fuel. Many of the higher actinides decay by spontaneous fission, a process which is accompanied by the emission of neutrons associated with fission. A secondary source of neutrons exists in oxide fuels where neutrons can be produced via the action of energetic alpha particles (primarily from the decay of higher actinides) on the $^{18}$O isotope of oxygen. It has been demonstrated by many workers that the neutron specific activity of spent fuel is related to burnup. Detailed mathematical relationships between the neutron emission rate and burnup have also been inferred using measurements on spent fuel assemblies. The functional form of this relationship is that the neutron emission rate is a function of assembly burnup raised to a power. Variables that affect the neutron emission rate include fuel type, initial enrichment, power history and decay time since discharge of the fuel assembly from the reactor.

Although spontaneously fissioning plutonium isotopes and plutonium alpha emitters are the dominant source of neutrons during the first fuel operation cycle, longer reactor core exposure times result in the production of curium isotopes which become the predominant source of the neutron specific activity for the spent fuel assembly. Most of the neutron emission will result from $^{242}$Cm (163 day half life) and $^{244}$Cm (17.9 year half life). For decay times more than a few years, $^{244}$Cm will be the major source of the neutron specific activity of a spent fuel assembly.

For shorter decay times, the neutron activity of $^{242}$Cm must be taken into account. Although the functional form generally covers all fuel assemblies of a particular design with different exponents for different design types, the curve will shift with initial enrichment. Therefore, knowledge of both the initial enrichment and time since discharge (decay time) are needed to accurately relate the observed neutron emission rate to burnup.

Typically, a combination of neutron measurements and reactor records are used to determine fuel burnup. In some cases, gamma ray measurements of fission product isotope gamma rays (primarily $^{137}$Cs) are used as a check on decay time. Either the gross gamma ray decay rate divided by the neutron emission rate can be related to groups of assemblies with common discharge times, or the $^{134}$Cs to $^{137}$Cs gamma decay rate ratio is measured directly to determine decay time. $^{134}$Cs has a half life of 2.06 years, and $^{137}$Cs has a half life of 30.1 years, so the decay rate ratio will change rapidly with time over a zero- to 20-year time period after discharge of the fuel assembly from the reactor. A measurement of either the $^{134}$Cs/$^{137}$Cs gamma emission ratio or the gross gamma emission rate is needed to verify the time since discharge (decay time) for the assembly. In the $^{134}$Cs/$^{137}$Cs case, the gamma ray intensity ratio provides a direct measure of the decay time. In the gross-gamma case, the assumption is made that most of the observed activity is $^{137}$Cs, and the gross gamma to neutron ratios allow the assemblies to be separated into groups according to common discharge times. The exact decay time is then determined from fuel assembly records.

Whether in support of pool storage or loading for dry storage, the measurements are conventionally carried out under water on isolated fuel assemblies which are raised from the fuel storage rack with an overhead crane. The detector fixture is designed to attach reproducibly to the fuel assembly, and normally measurements are carried out at the fuel center line with simultaneous measurements taken on opposite fuel flats to correct for asymmetries in the neutron emission rates.

The burnup verification methodology generally requires measurements to be performed on a set of fuel assemblies of a given type. The functional form for the neutron response as a function of burnup is established on the basis of at least three measurements and is updated as data from newly measured assemblies are added. Outliers are identified on the basis of agreement with the predictions of the fit function (usually, greater than three standard deviations from the predicted value is grounds for rejection), and identified for further study. Either incorrect records or a problem with the measurement could be responsible for outlier data points.

A common feature of all of the systems presently in use is that dependence is placed on a single measurement at one axial location. The neutron emission rate at that location depends on the average axial power profile for the reactor. While some of the presently available systems are capable of measurements at multiple axial locations, a sequence of adjustments of the relative position of the detectors and assembly is required for each measurement at each axial location. This measurement process entails measurement times roughly proportional to the desired number of axial positions and greater risk of fuel damage due to the large number of movements involved.

The present invention has been developed in view of the foregoing and other deficiencies of the prior art.

SUMMARY OF THE INVENTION

An improved method and apparatus for performing measurements related to spent nuclear fuel burnup are provided. The use of miniature, temperature- and radiation-resistant semiconductor detectors permits simultaneous monitoring of the gamma and neutron emission rates from spent nuclear fuel. Arrays of semiconductor detectors may be used to obtain information from key axial locations to define the axial burnup profile for spent nuclear fuel assemblies. Use of the improved spent fuel monitoring apparatus results in significant reductions in cost and time for the measurements, as well as improved accuracy, safety and reduced radiation doses to personnel involved in spent nuclear fuel measurements.

The nuclear detectors of the present invention preferably use a wide band gap semiconductor material such as SiC which is capable of providing data at elevated temperatures and is also a rad-hard semiconductor. Charged particle, neutron, and gamma ray detection may be accomplished with high-quality, miniature detectors having extremely low leakage currents which provide high-quality nuclear detection signals.

Miniature semiconductor detectors in accordance with a preferred embodiment of the present invention are capable of determining neutron and gross gamma emission rates in a single measurement. A single semiconductor detector can therefore perform the functions of both the neutron and gamma detectors in the presently used systems. The preferred nuclear detectors based on SiC semiconductors are thus capable of measuring gamma rays and neutrons simultaneously in a single, energy-resolved spectrum.

Arrays of the semiconductor detectors can simultaneously measure neutron emission rates at key axial locations in order to define the shape of the fuel burnup profile. For example, a stringer of miniature semiconductor neutron detectors which simultaneously record data and are multiplexed to provide independent data for each axial location may provide information on the entire axial burnup profile. The semiconductor detector arrays can perform measurements within channels or on opposite flats of spent fuel assemblies.

The present burnup verification system using semiconductor nuclear detectors offers several advantages. For example, miniature semiconductor detectors can be positioned more accurately than the detectors presently in use, and can be used to determine fuel axial burnup profiles during a single measurement interval. While conventional methods rely on the use of an overhead crane to isolate a spent fuel assembly, the present semiconductor detectors can perform measurements on spent fuel assemblies that are located in fuel racks. In accordance with the present invention, measurements can be safely carried out with less personnel in a shorter time while eliminating the requirement of moving fuel assemblies for measurement. For instance, a single miniature semiconductor detector can provide the same gamma and neutron information as the two much larger neutron and gamma detectors used on present systems. The preferred semiconductor detectors are capable of highly stable operation in severe radiation and temperature environments. Because of these advantages, measurements made with the present semiconductor-based system are less costly than those made with commercial systems.

An object of the present invention is to provide a system for measuring neutron and gamma emissions including a source of neutron and gamma emissions, and at least one detector positioned to receive the neutron and gamma emissions from the source. The detector comprises a semiconductor active region for generating an electronic signal in response to the neutron and gamma emissions from the source. The source of neutron and gamma emissions may comprise a nuclear fuel assembly, such as an assembly comprising spent nuclear fuel.

Another object of the present invention is to provide a method of measuring neutron and gamma emissions including the steps of providing a source of neutron and gamma emissions, and positioning at least one detector to receive the neutron and gamma emissions from the source, wherein the detector comprises a semiconductor active region for generating an electronic signal in response to the neutron and gamma emissions from the source.

Another object of the present invention is to provide a detector for measuring neutron and gamma emissions including a semiconductor active region for generating an electronic signal in response to neutron and gamma emissions received by the detector.

Another object of the present invention is to provide a detector array for measuring neutron and gamma emissions comprising multiple semiconductor detectors.

These and other objects of the present invention will become more apparent from the following description.

DETAILED DESCRIPTION OF THE PREFERRED EMBODIMENTS

Figure 1:
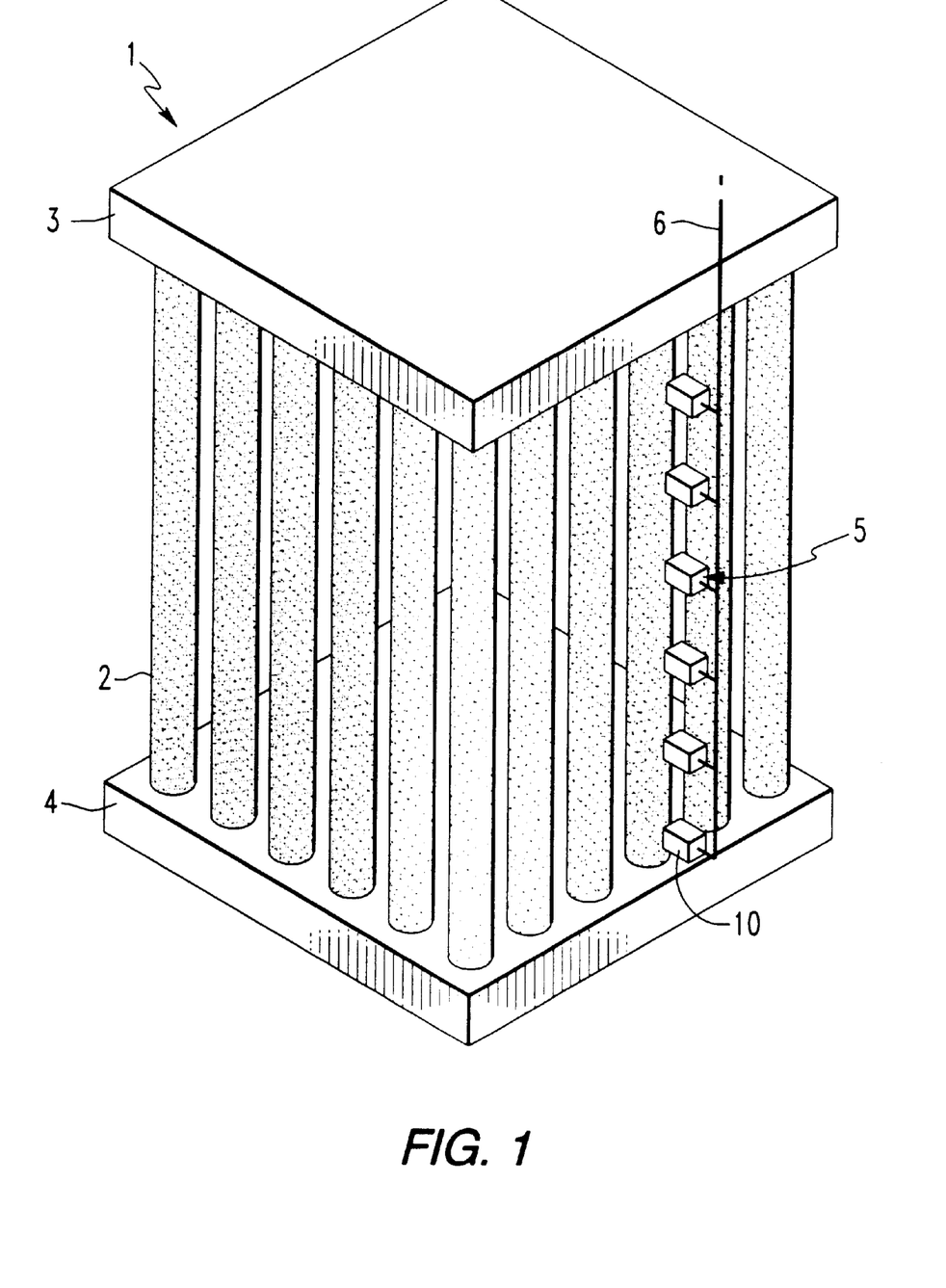
FIG. 1 is a partially schematic view of a neutron and gamma radiation detector string positioned adjacent a spent nuclear fuel assembly in accordance with an embodiment of the present invention.

FIG. 1 schematically illustrates the placement of a neutron and gamma semiconductor detector array adjacent to spent nuclear fuel in accordance with an embodiment of the present invention. As shown in FIG. 1, a system 1 is provided for measuring neutron and gamma emissions from spent nuclear fuel. As used herein, the term "neutron emissions" means production of neutrons including spontaneous fission, e.g., $^{244}$Cm decay, and (α, n) reactions as a secondary result of α-decay of actinide isotopes. The term "gamma emissions" means production of gamma-rays as an accompaniment to spontaneous alpha and beta decay of radioactive isotopes. The nuclear fuel is typically provided in the form of at least one fuel assembly 2 secured by a top plate 3 and bottom plate 4. The fuel assemblies 2 are thus provided in the form of a rack. In the embodiment shown in FIG. 1, an array 5 of semiconductor detectors 10 is provided in a string outside the rack of fuel assemblies 2. An electrical wire 6 or other suitable means is provided to transfer electronic signals generated by the semiconductor detectors 10. The array 5 of semiconductor detectors 10 extends along the axial length of the fuel assemblies 2. This arrangement permits neutron and gamma emissions to be measured at different axial locations along the fuel assemblies 2, and also permits measurement of the axial burnup profile of the fuel assemblies 2.

Figure 2:
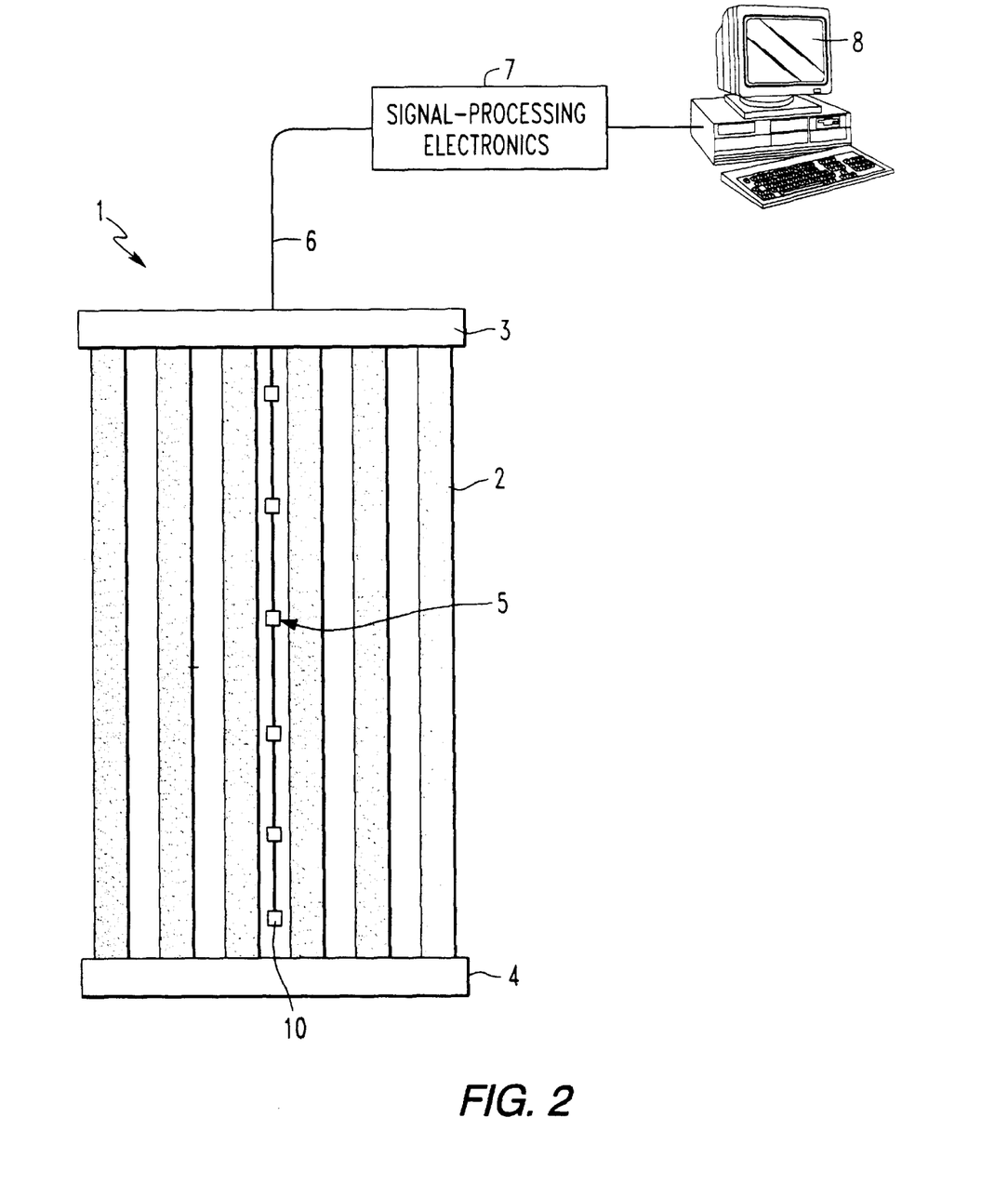
FIG. 2 is a partially schematic view of a neutron and gamma radiation detector string positioned within a spent nuclear fuel assembly in accordance with another embodiment of the present invention.

FIG. 2 schematically illustrates a semiconductor neutron and gamma detector array 5 positioned within a fuel assembly in accordance with another embodiment of the present invention. This embodiment is similar to that shown in FIG. 1, except the detector array 5 is located in the middle of the rack of fuel assemblies 2.

The detector arrays 5 shown in FIGS. 1 and 2 are connected by a wire 6 or any other suitable means to signal processing electronics 7. The signal processing electronics 7 process voltage pulses produced by interaction of gamma rays and neutron-induced charged particles and electronically counts the pulses. As shown in FIG. 2, a microprocessor 8 may be used to store data and/or generate a video display or a printout of the neutron and gamma ray measurements.

While six individual detectors 10 are shown in FIGS. I and 2, any suitable number may be used in the array 5 along the length of the fuel assembly. Preferably, the detector array 5 includes from 2 to about 100 individual semiconductor detectors, more preferably from about 4 to about 50 detectors. The spacing of the semiconductor detectors 10 may be varied depending on the radiation gradient of the fuel assembly. The spacing is chosen to give adequate information on the details of the shape of the axial gradient for a particular fuel type. For example, closer spacing would be used in arrays designed for boiling water reactor (BWR) fuel applications as opposed to pressurized water reactor (PWR) fuel where less severe gradients are encountered.

A typical design for a semiconductor burnup meter comprises a stringer of miniature SiC neutron/gamma detectors located at key axial locations along the fuel assembly over a length of up to about 150 inches. These individual semiconductor detectors preferably simultaneously record neutron and gamma ray count rates. The count rates are multiplexed to a measurement control computer such as a laptop PC. The computer preferably contains software to process the individual neutron and gamma-ray count rates, determine the shape of the burnup profile, and by analysis of the profile shape, accurately determine the total burnup of the assembly. The axial burnup profile data may also be used to accurately determine the maximum burnup location on the fuel assembly if desired for spent fuel cask loading operations.

Each semiconductor detector 10 of the present invention preferably comprises a neutron converter layer and a semiconductor active region which is designed to avoid radiation damage to the semiconductor material. Deterioration of prior art solid state radiation detectors caused by damage by energetic particles is a well known phenomenon. The accumulation of radiation damage in the semiconductor material leads to increased leakage current and decreased charge collection efficiency. This radiation damage is caused by the displacement of atoms in the semiconductor by the energetic charged particles. Over time, this damage causes substantial deterioration of detector performance.

As a charged particle loses energy in a material, it creates both electron excitation events and displaced atoms. The energy loss can be described by the Bragg curve. The preferred neutron detector array of the present invention takes advantage of the change in the partitioning between electronic excitation and displacement events along the range of the charged particle. For high energy alpha particles ($^4$He ions), electron excitation is the predominant energy loss mechanism. As the particle loses energy, the importance of displacement damage increases. Most of the displacement damage therefore occurs near the end of the range of travel of the charged particles.

In the preferred semiconductor detectors 10 of the present invention the type of neutron converter layer, the type of semiconductor material, and the thickness and placement of the semiconductor active region are controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse. The relatively thin semiconductor detectors of the present invention are substantially less susceptible to radiation damage than conventional thick semiconductor detectors.

Figure 3:
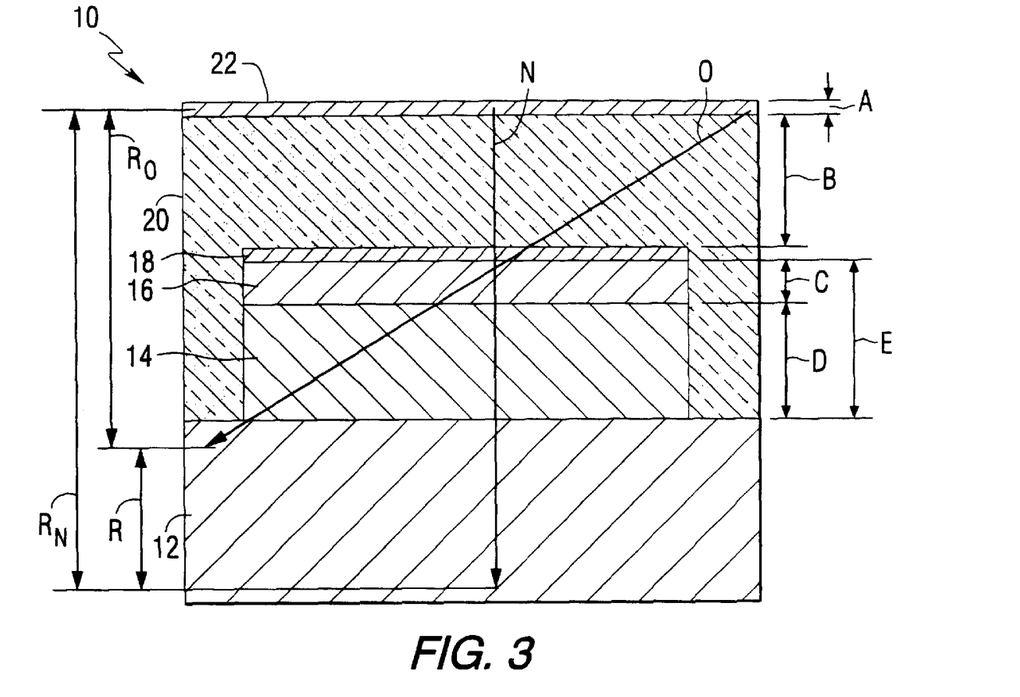
FIG. 3 is a partially schematic side sectional view of a solid state neutron detector suitable for use in monitoring nuclear radiation in accordance with an embodiment of the present invention.

FIG. 3 schematically illustrates a semiconductor detector 10 for use in accordance with an embodiment of the present invention. FIG. 3 is not drawn to scale for purposes of illustration. The semiconductor detector 10 preferably includes a substrate 12 made of a semiconductor material such as SiC, GaAs, CdTe, diamond, Ge, Si or other appropriate material. The substrate D preferably has a thickness of about 100 to 1000 microns. For high temperature operations, the substrate 12 is preferably made of temperature resistant materials such as SiC, diamond, silicon nitride, gallium nitride and indium nitride. Where SiC is used as the substrate 12 it may be doped with sufficient amounts of nitrogen or other appropriate impurities to provide sufficient conductivity. The substrate 12 may be formed by processes such as high-purity crystal growth or chemical vapor deposition.

In the embodiment shown in FIG. 3, a semiconductor P-N junction is formed by an N-type semiconductor layer 14 and a P-type semiconductor layer 16. The N-type and P-type semiconductor layers 14 and 16 define the semiconductor active region of the semiconductor detector 10. Silicon and germanium are suitable semiconductor materials for the active region. However, for high temperature operations, the semiconductor active region 14, 16 is preferably made of temperature resistant materials capable of operating at temperatures above 100° C., such as SiC, diamond, GaAs, GaP, PbO and CdS. Where SiC is used as the N-type and P-type layers, such layers are preferably formed by chemical vapor deposition of layers containing an appropriate amount of impurity atoms to increase conductivity. For example, when nitrogen is the dopant, typical concentrations in the N- and P-type layers are about $10^{15}$ and greater than about $10^{19}$ atoms per cm$^3$, respectively. While the active region shown in FIG. 3 comprises a P-N junction, other types of solid state active regions may be used such as Schottky diodes, diffused junction devices, ion implanted diodes or surface barrier detectors.

Although SiC detectors are the preferred semiconductor devices for performing neutron and gamma measurements in spent fuel monitoring applications, other detector types may perform the same function. For example, silicon semiconductor neutron detectors may be configured to perform measurements within a spent fuel assembly. Silicon p-n junctions may therefore be used to measure gamma and neutron fields. However, silicon devices would need to be cooled in order to operate properly in spent fuel environments, because the thermally-generated noise pulses that are prevalent in silicon detectors would be indistinguishable from the low pulse height gamma pulses. A thermoelectric cooler could be used to cool the detector to 75° K. or less to reduce the thermally-generated pulses to acceptable levels.

In order to avoid the need for detector cooling, other wide band gap semiconductors could be used. Among the group of detector materials that could be used are diamond, GaAs, CdTe, CdZnTe, GaP, PbO, CdS, PbBr$_2$ and PbI$_2$. Although these materials may not have the combination of properties for nuclear fuel monitoring as does SiC, convenience or availability may dictate their use in specific applications. Alternatively, miniature gas-filled detectors could be used. However, this would require separate neutron and gamma detectors, and both types of detectors would require high (100–1000V) externally-applied voltages.

In the embodiment of FIG. 3, electrical contacts are made to the semiconductor active region 14, 16 by means of the conductive substrate 12 and a thin conductive contact 18. Conventional electrical connections may be made to the substrate 12 and the contact 18 to receive electronic pulses from the semiconductor active region 14, 16 during operation of the detector. The contact 18 preferably has a thickness of from about 0.075 to 1 micron, and is made of any suitable material such as gold, platinum, aluminum, titanium or nickel.

An optional insulating material 20 may be provided around at least a portion of the semiconductor active region 14, 16 in order to protect the active region from mechanical stresses and/or chemical attack. The insulating material 20 may also be used to space the semiconductor active region 14, 16 a desired distance from a neutron converter layer 22, as more fully described below. The insulating material 20 may comprise any suitable material such as oxides, nitrides and phosphides. For high temperature operations, oxides such as SiO$_2$ are particularly suitable. The SiO$_2$ layer may be formed by methods such as chemical vapor deposition.

The semiconductor detector 10 includes a neutron converter layer 2 which generates charged particles when the layer is impinged by neutrons. The neutron converter layer may comprise a relatively thin film or coating, or may comprise a doped region of the device. The composition of the neutron converter layer 22 is selected such that upon impingement by neutrons, charged particles such as $^1$H, $^3$H, $^7$Li and $^4$He ions are generated. Species capable of generating such charged particles include $^6$Li, $^{10}$B, H, and $^3$He. Alternatively, fissionable materials such as $^{235}$U, $^{233}$U or $^{239}$Pu can be used to produced charged particles in the form of energetic fission fragments. Suitable materials for the neutron converter layer 22 include Li-containing materials such as LiF, Li$_2$O and lithium metal, and B-containing materials such as ZrB$_2$, B$_4$C, H$_3$BO$_3$ and elemental boron. The neutron converter layer 22 may be deposited on the insulating material 20 shown in FIG. 3 by chemical vapor deposition, or manufactured as a free-standing layer which is attached to the device. Alternatively, the neutron converter layer 22 may be deposited directly on the semiconductor active region 14, 16. In this case, the neutron converter layer 22 may be used as an electrical contact in place of the contact 18. For example, the contact 18 may be doped with Li to serve a dual purpose as an electrical contact and a neutron converter layer.

The size of the semiconductor active region 14, 16 and its placement in relation to the neutron converter layer 22 are preferably controlled in order to minimize radiation damage. As shown in FIG. 3, the neutron converter layer 22 is relatively thin, having a thickness A preferably ranging from about 0.1 to about 10 microns. The optional insulating material 20 has a thickness B which is selected in order to minimize displacement damage caused by charged particles, as more fully described below. The thickness B of the insulating material 20 typically ranges from 0 to 10 microns or more. The P-type semiconductor layer 16 has a thickness C, while the N-type semiconductor layer 14 has a thickness D. The thickness C preferably ranges from about 0.1 to about 5 microns, while the thickness D preferably ranges from about 1 to about 10 microns. The semiconductor active region, which is defined by the N-type and P-type layers 14 and 16, has a thickness E. The thickness E preferably ranges from about 1 to about 15 microns, and is selected such that dislocation damage caused by charged particles is minimized.

As shown in FIG. 3, upon impingement by neutrons, some charged particles exit the neutron converter layer 12 in a normal direction N. As more fully described below, a charged particle traveling along direction N will cause electron excitation events as it travels, and will eventually come to rest a distance $R_N$ from the neutron converter layer 22. The semiconductor active region 14, 16 having the thickness E is positioned in relation to the neutron converter layer 22 such that the charged particles traveling in the direction N cause ionization within the thickness of the semiconductor active region E, and pass through the active region before they come to rest. In this manner, dislocation damage within the active region is prevented.

As shown in FIG. 3, charged particles exiting the neutron converter layer 22 will also travel at non-normal angles, such as in the oblique direction O. Charged particles traveling along direction O pass through the semiconductor active region 14, 16 and come to rest a distance $R_O$ from the neutron converter layer 22. The charged particles thus pass through the semiconductor active region 14, 16 in many different directions ranging from normal angles N to relatively shallow oblique angles O. The range of the charged particles is defined by a band R which is located away from the neutron converter layer a minimum distance of $R_O$ and a maximum distance of $R_N$. As schematically shown in FIG. 3, the range of the charged particles falls in a band R outside of the semiconductor active region 14, 16. Instead of causing dislocation damage within the active region, the charged particles come to rest in the substrate 12.

While the active region shown in FIG. 3 comprises a P-N junction, other types of solid state diodes may be used. For instance, the P and N layers of the P-N junction could be replaced with metal/$n^-$/$n^+$ Schottky diode layers. Thus, for example, a Schottky diode may be used comprising a contact metal layer of Au, Ni or Pt, an $n^-$ layer of SiC, an $n^+$ layer of SiC, and a conductive SiC substrate.

Figure 4:
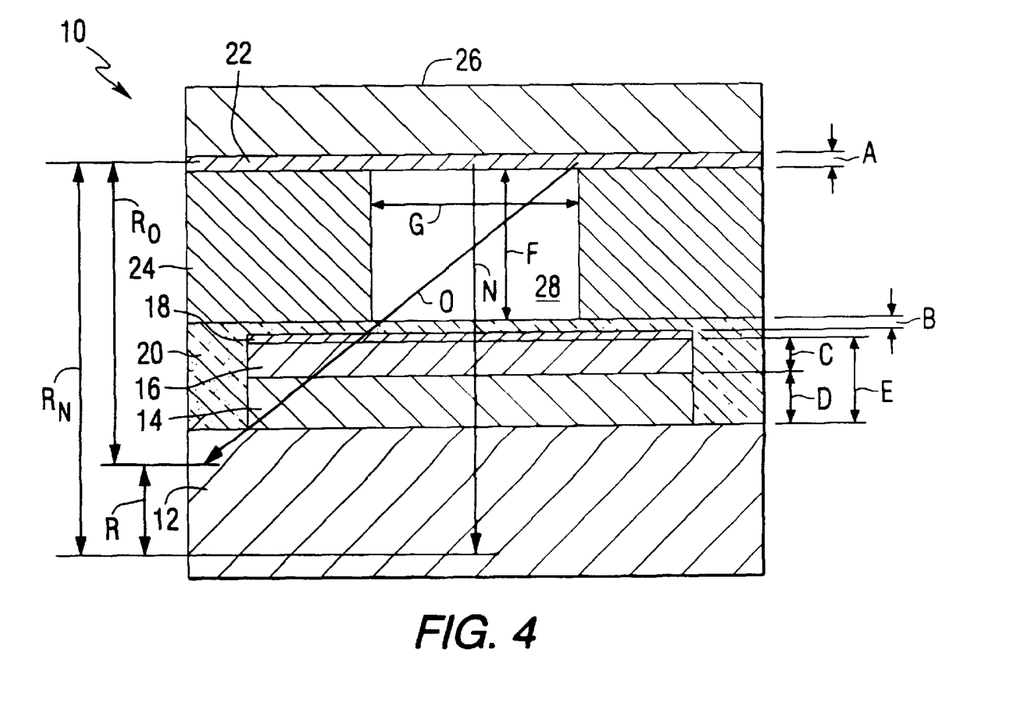
FIG. 4 is a partially schematic side sectional view of a solid state neutron detector suitable for use in monitoring nuclear radiation in accordance with another embodiment of the present invention.

FIG. 4 schematically illustrates a semiconductor detector 10 for use in accordance with another embodiment of the present invention. The semiconductor detector 10 of FIG. 4 likewise includes a substrate 12 having an N-type semiconductor layer 14 and P-type semiconductor layer 16 disposed thereon. An electrical contact 18 and optional insulating material 20 are also incorporated in the detector of FIG. 4. A collimator 24 is positioned between the active region 14, 16 and the neutron converter layer 22. The collimator 24 may be made of any suitable ion absorbing material such as $SiO_2$, SiC or silicon nitride. The collimator 24 includes an inner passage 28 having a length F and a width G. The inner passage may comprise a gas such as air, nitrogen or helium. A cap 26 made of any suitable material such as aluminum or nickel provides support for the neutron converter layer 22. The collimator 24 is used to reduce the number of charged particles which enter the semiconductor active region 14, 16 at shallow angles. The height F of the inner passage 28 is preferably at least twice the width G of the passage. Charged particles exiting the neutron converter layer 22 at highly oblique angles are absorbed by the walls of the collimator 24 and do not pass into the active region 14, 16.

As shown in FIG. 4, charged particles traveling in a normal direction N come to rest a distance $R_N$ from the neutron converter layer 22. Charged particles traveling in an oblique direction O come to rest a distance $R_O$ away from the neutron converter layer 22. The range of the charged particles is defined by a band R which is located a minimum distance $R_O$ from the neutron converter layer 22 and a maximum distance $R_N$ from the neutron converter layer. By increasing the ratio of the height F to width G of the inner passage 28, the maximum angle between the normal direction N and oblique direction O is decreased, thereby decreasing the width of the band R.

In accordance with a preferred embodiment of the present invention, the semiconductor detectors, such as those shown in FIGS. 3 and 4, are capable of generating neutron and gamma emissions data without an externally applied voltage. Because of the inherent bias of the device caused by the migration of electrons across either the p-n junction or Schottky contact, charge can be collected without applying an external voltage. This mode is referred to as zero-bias operation.

Figure 5:
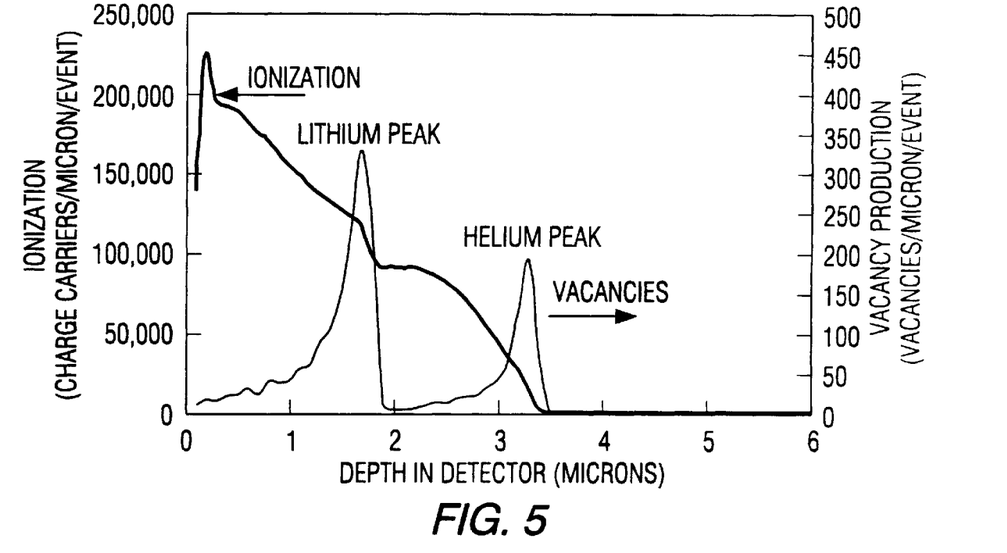
FIG. 5 is a graph of detector depth versus ionization and vacancy production for $^{10}$B reaction products in a silicon carbide detector of the present invention.

Energy deposition curves for charged particles in the detector material may be used to determine the appropriate thickness of the semiconductor active region. Such energy deposition curves may be established from the TRIM computer code developed by Biersack and Ziegler, or other conventional range-energy calculation methods. The distribution curves for ionization and vacancy production by a normally incident beam of $^{10}$B reaction products in SiC is illustrated in FIG. 5. The reaction products comprise charged particles of Li and He ions. Due to its relatively high atomic number (Z), the range of the Li ion is relatively short, i.e., about 1.75 microns. The range of the He ion is nearly double the Li ion range. The displacement damage caused by each type of ion occurs near the end of the range. As shown in FIG. 5, in the first micron, the energy loss to ionization is relatively high and only minimal displacement damage occurs. At about 1.6 microns displacement damage caused by Li ions reaches a peak. After about 1.8 microns ionization energy loss again dominates displacement damage. However, at about 3.3 microns dislocation damage caused by He ions reaches a peak. In order to avoid dislocation damage, the semiconductor active region is positioned in a region where ionization energy loss is high and displacement damage is low. Thus, for a normally incident beam of reaction products, the SiC active region may be positioned at a distance of less than about 1.5 microns from the boron neutron converted layer and/or at a distance between about 1.8 and 3.1 microns from the neutron converter layer.

Figure 6:
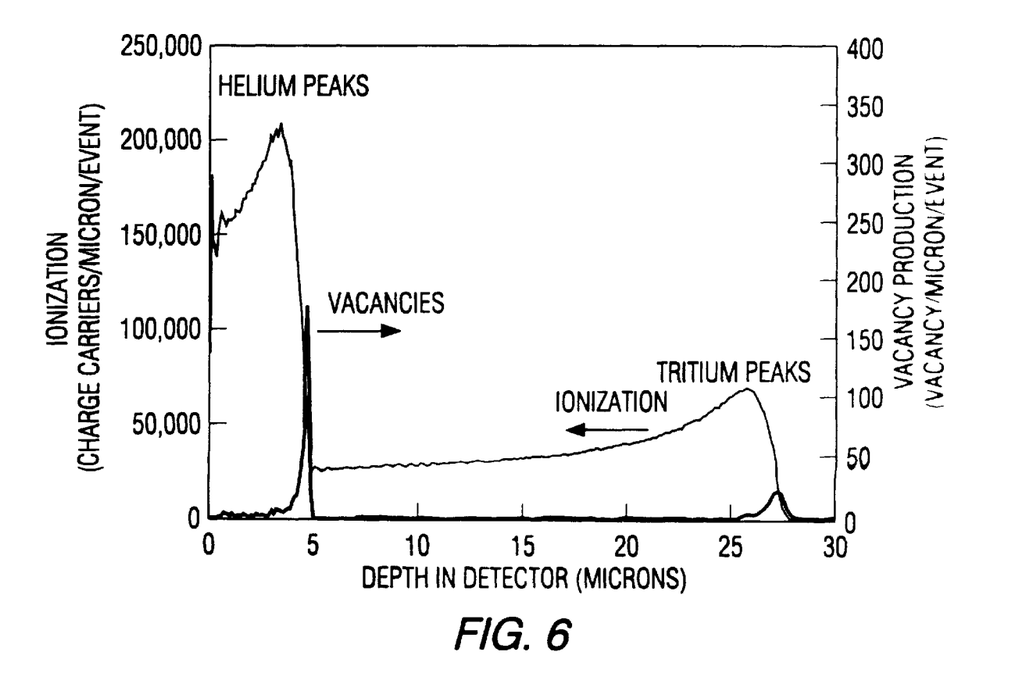
FIG. 6 is a graph of detector depth versus ionization and vacancy production for $^6$Li reaction products in a silicon carbide detector of the present invention.

FIG. 6 illustrates energy loss curves for a normally incident beam of $^6$Li reaction products in SiC. The reaction products comprise charged particles of $^4$He and $^3$H (tritium) ions. In comparison with the $^{10}$B reaction products shown in FIG. 5, the near surface low damage zone is larger for the lower Z, higher energy products of the $^6$Li reaction. As shown in FIG. 6, the He ions are the higher Z products with a shorter range of about 4.5 or 5 microns. The H ions have a longer range of about 27 microns. For the lithium reaction products, the low damage region extends over approximately the first 4 microns of the detector. At about 5 microns, dislocation damage caused by He ions reaches a peak, but quickly subsides thereafter. From about 5 microns to about 27 microns, ionization energy loss is again maximized. However, at about 27 microns dislocation damage caused by H ions reaches a peak. Thus, for a normally incident beam of reaction products, the SiC semiconductor active region should therefore be located at a distance of less than about 4 microns from the lithium neutron converter layer and/or at a distance between about 5 and 27 microns from the neutron converter layer.

Figure 7:
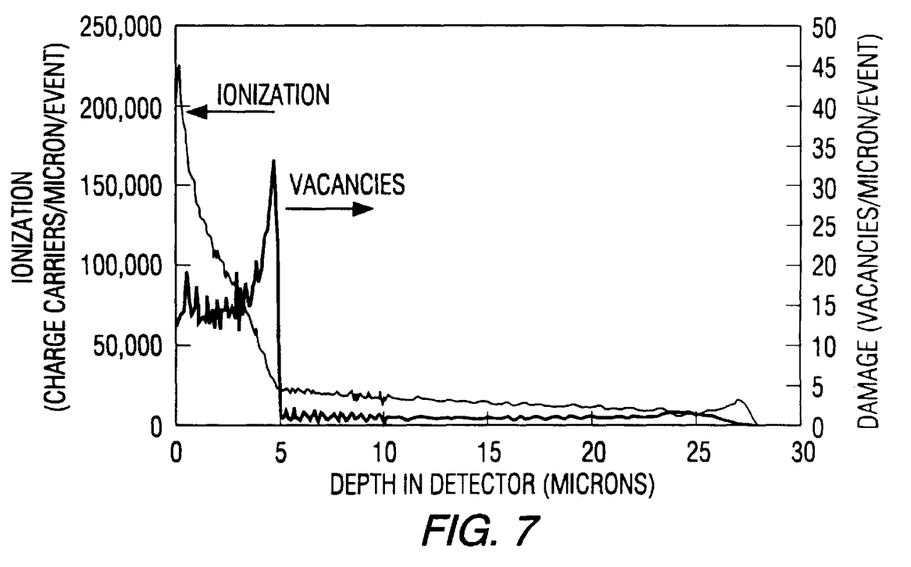
FIG. 7 is a graph of detector depth versus ionization and vacancy production for $^6$Li reaction products in a silicon carbide detector of the present invention for randomly distributed reaction products.

As discussed above, the semiconductor detector 10 is preferably provided with an active zone that corresponds to a region with a high ratio of ionization energy loss to displacement damage production. The spacing between the neutron convertor layer and the active region of the detector is preferably controlled depending on the incident radiation. For a normally incident beam, the neutron convertor layer may advantageously be placed adjacent to the semiconductor active region. However, the angular distribution of reaction product ions exiting the neutron convertor layer is usually random. This leads to a broadening of the energy dissipation curves as illustrated in FIG. 7 for the $^6$Li reaction. For this broadened curve, with SiC as the semiconductor active region, the maximum ionization to displacement ratio occurs between about 5 and 15 microns. Thus, the SiC active region is preferably about 5 to 10 microns thick and is spaced about 5 microns from the neutron converter layer. The semiconductor active region is thereby positioned away from the neutron converter layer in a location where the ratio of ionization energy loss to displacement damage is maximized.

Figure 8:
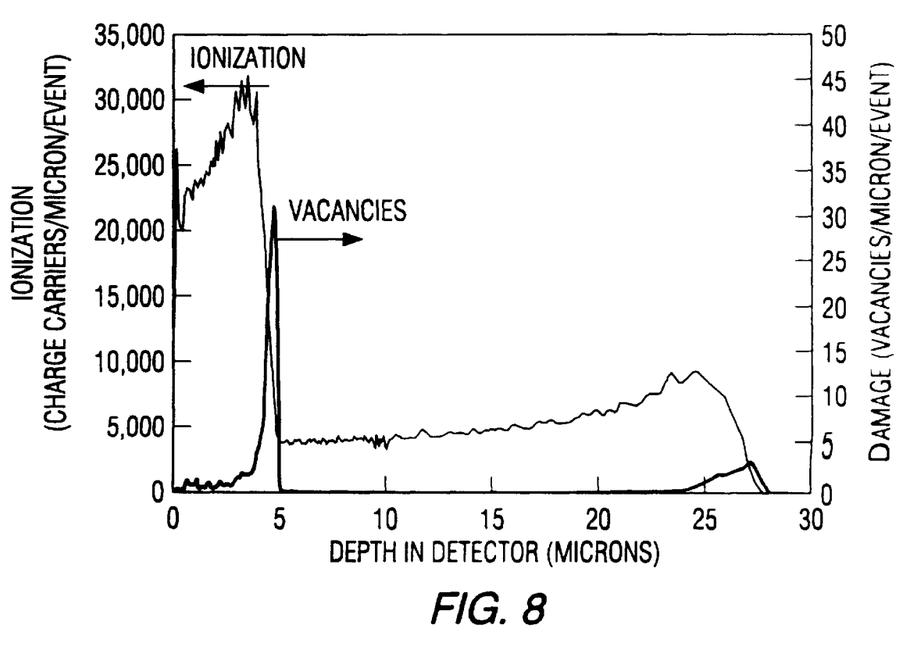
FIG. 8 is a graph of detector depth versus ionization and vacancy production for $^6$Li reaction products in a silicon carbide detector of the present invention with collimated reaction products.

An energy deposition curve for a collimated beam with Li as the neutron converter layer and SiC as the semiconductor active region is shown in FIG. 8. Although slight broadening of the damage peak is noted, the number of vacancies produced in the first 3.5 microns of the detector approximates the levels obtained from a normally incident beam, as shown in FIG. 6. While the use of a collimator may reduce the overall signal of the device by eliminating a proportion of the incident radiation, compensation for this signal loss may be provided by increasing the concentration of Li in the neutron convertor layer. Alternatively, microchannelling devices may be used to eliminate shallow incident angles. However, the increased collimation provided by such devices may not be sufficient to justify the resultant decrease in signal intensity.

The following examples are intended to illustrate the production of semiconductor detectors suitable for detecting neutron and gamma radiation, and are not intended to limit the scope of the invention.

EXAMPLE 1

A semiconductor detector is made by forming a SiC substrate 500 microns thick. The SiC substrate is formed by the process of high-purity crystal growth. An N-type SiC layer 8 microns thick and 400 microns in diameter having a composition of $1\times10^{15}$ nitrogen atoms per cm$^3$ is deposited on the SiC substrate by chemical vapor deposition. A P-type SiC layer 1.2 microns thick and 400 microns in diameter having a composition of $10^{19}$ nitrogen atoms per cm$^3$ is deposited on the N-type layer by chemical vapor deposition. An electrical contact layer comprising gold having a thickness of 0.2 micron is deposited on the P-type layer by vapor deposition. A layer of $SiO_2$ having a thickness of 1.5 microns is deposited over the contact layer and doped SiC layers by chemical vapor deposition. A neutron converter layer 2 microns thick comprising $^6$LiF is deposited on the $SiO_2$ insulating layer by chemical vapor deposition. Electrical connections are made to the conducting SiC substrate and contact layer by means of micro soldering.

EXAMPLE 2

A semiconductor detector is made by forming a SiC substrate 500 microns thick. The SiC substrate is formed by the process of high-purity crystal growth. An n$^+$ layer 1.5 microns thick and 400 microns in diameter having a composition of greater than $10^{18}$ nitrogen atoms per cm$^3$ is deposited on the SiC substrate by chemical vapor deposition. An n$^-$ layer 3 microns thick with a diameter of 400 microns having a nitrogen impurity concentration of $10^{15}$ atoms per cm$^3$ is deposited on the n$^-$ layer by chemical vapor deposition. A Schottky metal contact consisting of 0.05 microns of nickel with a diameter of 400 microns is deposited on the n$^-$ SiC layer by vacuum deposition. A gold protective layer 1 micron thick with a diameter of 400 microns is deposited on the nickel Schottky layer. A neutron converter layer 2 microns thick and 400 microns in diameter comprising Li is deposited on the gold protective layer by vapor deposition. Electrical contacts are established to the SiC substrate and Schottky metal by micro soldering and a metallic pad contact, respectively.

EXAMPLE 3

A semiconductor detector is formed as in Examples 1 and 2, except a collimator structure is added. In the case of the detector of Example 1, the collimator structure is placed between the $SiO_2$ layer and the neutron converter layer. In the case of Example 2, the collimator structure is placed between the gold protective layer and the neutron converter layer. In both cases, the neutron converter layer is free-standing and is made by vacuum deposition of LiF onto a nickel backing layer 4 microns thick. The collimator structure consists of an annular aluminum layer with a thickness of 400 microns and a diameter of 400 microns, and having an annulus with a diameter of 200 microns. The collimator structure is produced by a combination of vapor deposition and reactive-ion etching.

The use of semiconductor detectors for detecting neutron and gamma emissions in accordance with the present invention provides several advantages over conventional designs. The use of a relatively thin semiconductor active region substantially reduces radiation damage. In addition, the use of high temperature resistant materials such as silicon carbide in the active region of the detector permits extended use in high temperature environments.

Figure 9:
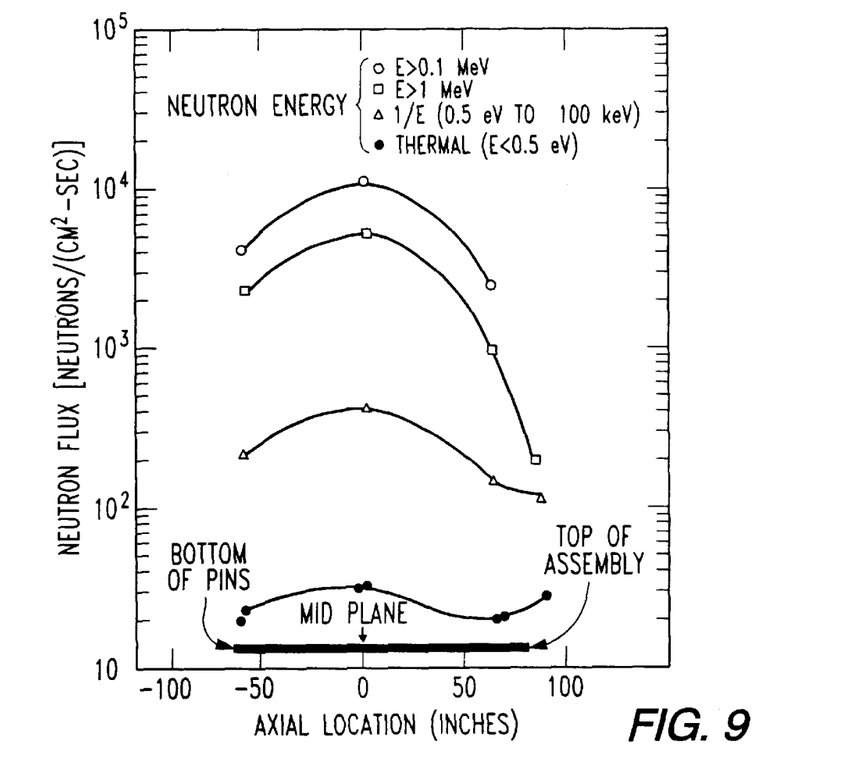
FIG. 9 is a graph showing axial neutron count rate distribution measured along the face of a spent fuel assembly.

FIG. 9 shows reported Solid State Track Recorder (SSTR) measurements of the neutron emission rate for spent fuel assemblies. These data were taken for a spent fuel assembly from a Pressurized Water Reactor (PWR) that had an average burnup of 25,665 Mwd/MTU and had been discharged approximately 2.7 years prior to the SSTR neutron measurements. It can be seen from the data presented in FIG. 9 that the fast neutron ($E_n>1$ MeV) emission rate has an axial profile which is closely related to the burnup profile for the spent fuel assembly. This axial burnup profile is also well represented by the data for neutrons with energies greater than 0.1 MeV. The thermal neutron data are very insensitive to the burnup profile. However the epithermal (epicadmium) neutron data show a reasonable approximation of the axial gradient. This characteristic is the basis for the use of cadmium-shielded neutron detectors in the present commercial systems. Although the axial burnup distribution is highly symmetric for PWRs and can be predicted by depletion codes which provide assembly burnup profiles, relying on a single axial measurement can lead to a loss of accuracy in the determination of burnup. This loss of accuracy is particularly true in the case of Boiling Water Reactor (BWR) fuel assemblies which have highly asymmetric burnup profiles and more severe axial gradients than PWRs, showing lower fuel burnup in the upper end of the fuel.

Figure 10:
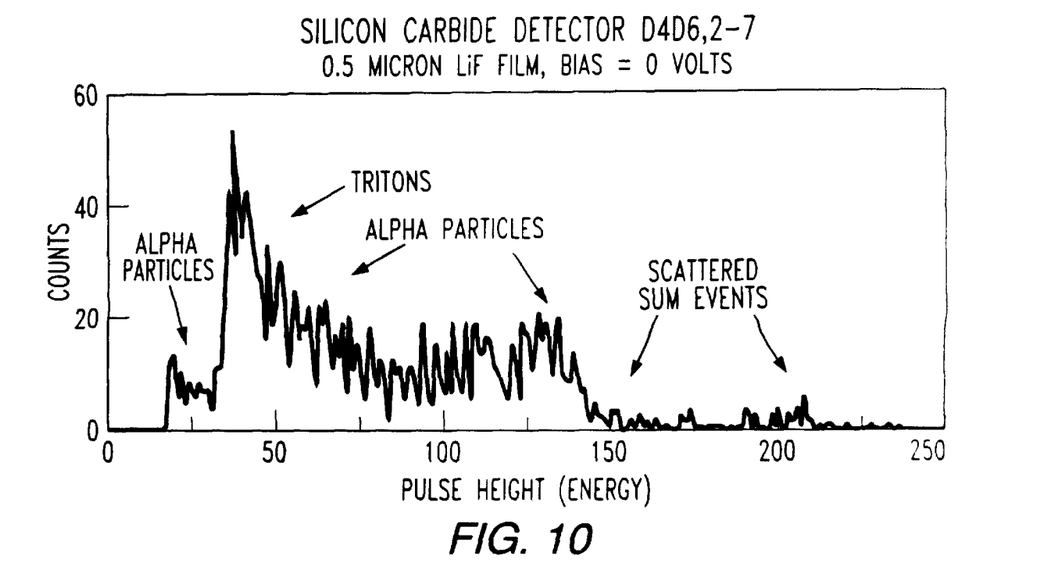
FIG. 10 is a graph showing the response of a semiconductor detector of the present invention irradiated with neutrons.
Figure 11:
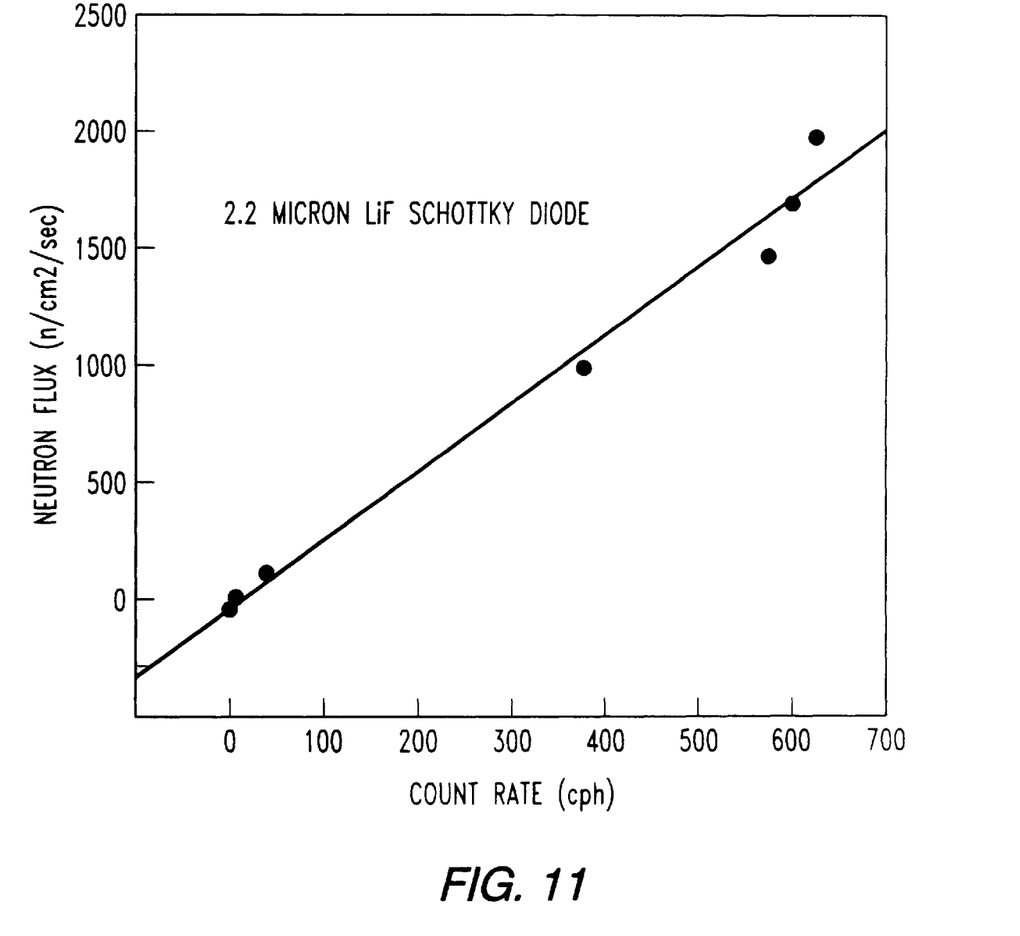
FIG. 11 is a graph showing thermal neutron flux as a function of neutron count rate for a semiconductor detector of the present invention.

An example of a neutron-induced charged particle spectrum obtained with a SiC detector is shown in FIG. 10. In this case, a 400 $\mu$m diameter SiC Schottky diode equipped with a 0.5-$\mu$m thick $^6$LiF neutron converter layer was exposed to thermalized neutrons from a $^{252}$Cf isotopic source. The charged particle spectrum is produced by the energetic reaction products from the $^6$Li(n,$\alpha$)$^3$H reaction. The portions of the spectrum that correspond to the alpha particle ($^4$He) and triton ($^3$H) are identified in FIG. 10. Neutron detection using $Zr^{10}B_2$ and $^{235}$U converter layers was also demonstrated. In the case of $^6$LiF, a linear response to thermal neutron flux was demonstrated over three orders of magnitude in neutron flux, and these data are shown in FIG. 11.

Figure 12:
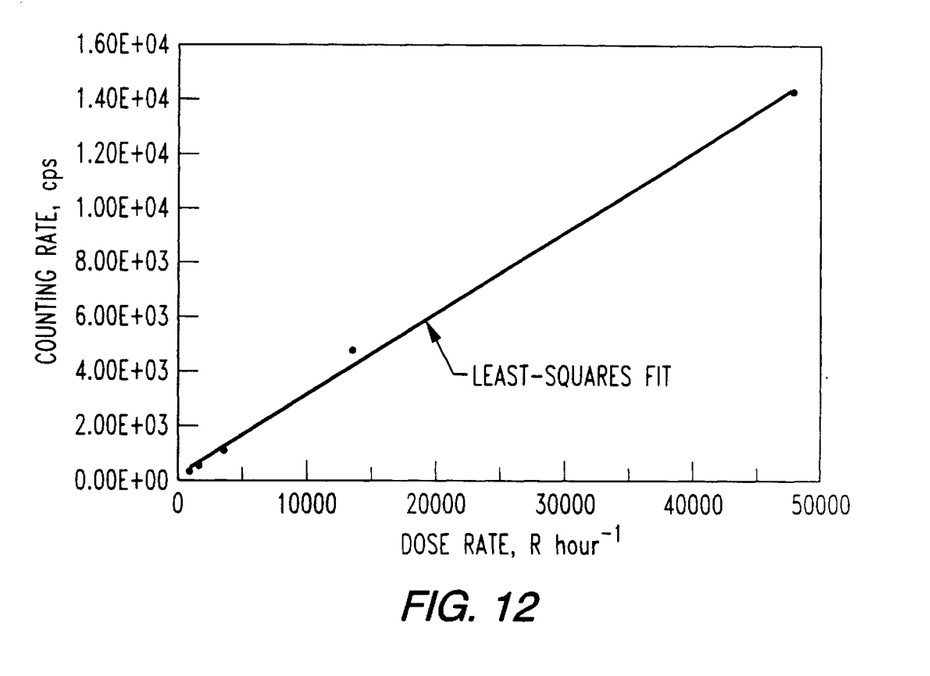
FIG. 12 is a graph showing gamma count rate as a function of gamma ray dose for a semiconductor detector of the present invention.

The SiC detectors were also tested in intense gamma ray fields using a gamma hot cell. In these tests, $^{60}$Co sources were used to produce local gamma ray fields with known dose rates up to 50,000 R/hr. Although the response to gamma rays was extremely low, a linear relationship between gamma-induced SiC count rate and gamma dose was observed at doses up to almost 50,000 R/hr (the upper gamma exposure limit in the present hot cell configuration). These data are contained in FIG. 12.

A major advantage of the SiC neutron and gamma ray response is that the neutron- and gamma-induced pulses are completely separable on the basis of pulse height. The neutron-induced charged particle pulse height spectrum shown in FIG. 10 is typical for the $^6$Li case. The gamma ray induced signal is generally confined to much lower pulse heights than the neutron-induced charged particle spectrum.

Figure 13:
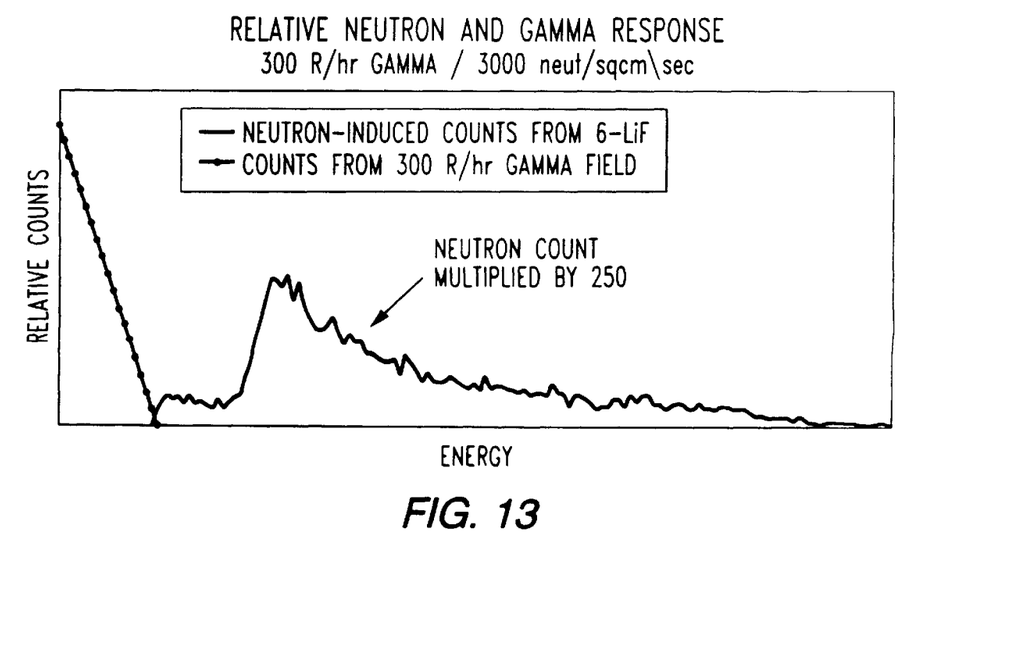
FIG. 13 is a graph showing a comparison of neutron-induced and gamma ray-induced signals in a semiconductor detector of the present invention. The magnitudes of the neutron and gamma ray fields are similar to those expected in the vicinity of a spent fuel assembly.

A combined gamma ray and neutron-induced pulse height spectrum is shown in FIG. 13. In this case, the response from a 300 R/hr gamma ray field is shown together with the response from a 3000 neutron/cm$^2$/second thermal neutron flux. FIG. 13 illustrates that gamma ray count rate (e.g., $^{137}$Cs) and neutron (e.g. $^{244}$Cm and $^{242}$Cm spontaneous fission) count rates can be determined simultaneously with a single SiC detector. The conventional Los Alamos Fork Detector, for example, requires a cadmium-covered $^{235}$U fission chamber to detect neutrons and a gamma ionization chamber to detect gross gammas. Both of these large detectors could be replaced with a simpler, more compact, SiC detector which is less sensitive to temperature and other environmental conditions in the measurement location. In addition, the SiC detector can provide neutron flux gradient data which can define the assembly burnup profile, and, thereby, improve the accuracy of burnup validation measurements.

The SiC detector responses to both neutron and gamma-ray flux are both highly linear. The gamma ray and neutron responses are separable on the basis of pulse height. The response of SiC detectors has been found to be completely insensitive to temperature in the range from 20 to 90° C., and SiC detectors may be capable of operating at temperatures up to 700° C. or more. The nuclear response characteristics of individual SiC nuclear detectors have been found to be highly reproducible and detector-to-detector variations in response have not been observed. Furthermore, the SiC detectors have been found to provide robust nuclear signals in the absence of an externally applied voltage.

The use of semiconductor neutron/gamma detectors offers several clear advantages for burnup verification measurements. Semiconductor neutron/gamma detectors can be miniaturized to dimensions less than millimeters, thereby allowing insertion into fuel channels, e.g., the instrumented channel, if desired during burnup measurements. The neutron spectrum within a fuel assembly is primarily a function of the characteristics of the fuel assembly itself and is not appreciably perturbed by the presence of neighboring fuel assemblies. Therefore, miniature semiconductor neutron/gamma detectors may be used to perform burnup measurements of fuel assemblies in support of pool storage without the need to remove the assemblies from the rack, offering an enormous advantage over presently-used methods which all require removal/isolation of the fuel assembly being measured. In support of fuel loading for dry storage, semiconductor detectors may be used for measurements made either inside a channel or on opposite assembly flats.

In accordance with the present invention, an elongated stringer of miniature semiconductor neutron/gamma detectors can be easily designed to simultaneously obtain data from key axial locations and thereby provide information on the assembly burnup profile. Increased assembly burnup measurement accuracy results from obtaining complete axial burnup profiles.

In addition, the present semiconductor detectors provide data on gamma and neutron count rates simultaneously in a single spectrum, thereby eliminating the need for an additional gamma ionization chamber, a NaI(Tl) scintillation gamma detector or a HPGe semiconductor gamma detector, and the associated electronics and liquid nitrogen system. In addition, the present semiconductor detectors can supply neutron and gamma ray data without the need for an externally applied voltage (zero-bias operation).

Figure 14:
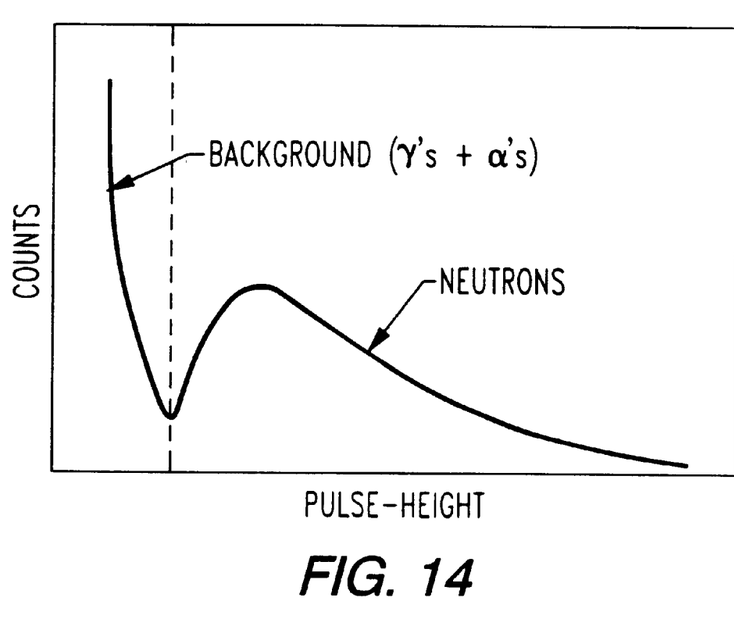
FIG. 14 is a graph of typical pulse height spectra obtained with a $^{235}$U fission chamber.
Figure 15:
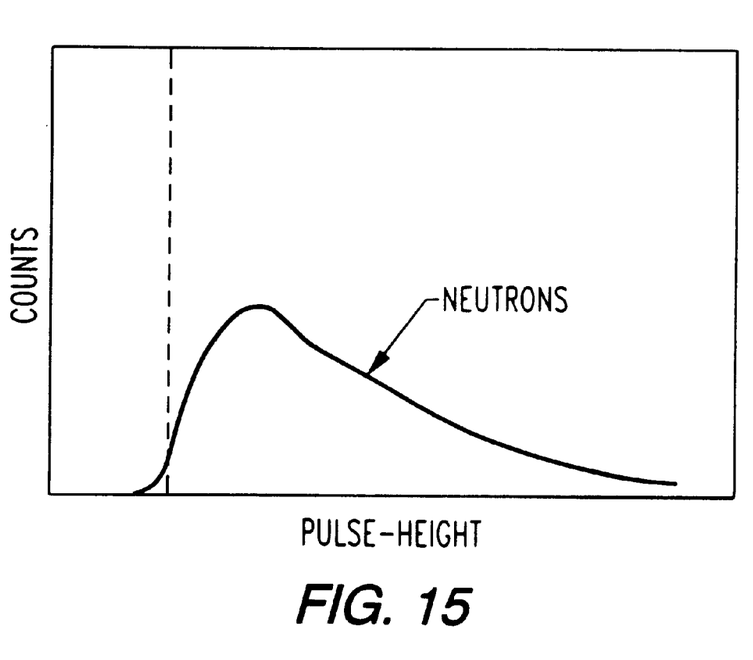
FIG. 15 is a graph similar to FIG. 14 with background radiation removed.

Conventional burnup meters that rely on neutron and gross gamma count rates to determine fuel assembly burnup are typically designed to obtain measurements at a fixed location from opposite flats of the fuel assembly. The neutron detectors are $^{235}$U fission chambers, typically both bare and cadmium-covered, to isolate the epicadmium neutron response which can be related to the local fuel assembly burnup. These detectors are sensitive to gamma rays which produce a low-energy pulse height distribution as shown in FIGS. 14 and 15. However, because $^{235}$U is an alpha-emitter, low pulse height alpha events are included in the gamma ray continuum, necessitating a separate gamma ionization chamber to determine the gross gamma count rate from the fuel. Thus, a typical Fork Detector used for burnup verification contains three relatively large, gas-filled detectors with the associated electronic signal processing and cabling.

The semiconductor detectors of the present invention preferably provide both neutron and gross gamma count rates simultaneously. Because a radioactive, alpha-emitting neutron-converter material need not be used in the present semiconductor detectors, alpha particle events are not present to interfere with the gamma ray induced signal. Furthermore, the gamma count rate has been found to be directly proportional to the volume of the depleted region in the SiC semiconductor. Therefore, the design of the semiconductor detector can be optimized to provide acceptable simultaneous neutron and gamma ray count rates under typical operating conditions, e.g., neutron fluxes of $10^3$ to $10^4$ neutrons/cm$^2$/second in the presence of $10^4$ to $10^5$ R/hr gamma ray fields. Furthermore, the present semiconductor detectors can be miniaturized, allowing fuel assembly measurements to be made either inside the assembly or on opposite flats.

The present burnup meter offers obvious advantages in measurement system simplicity and overall measurement accuracy over conventional meters. Superior accuracy in burnup measurements is provided with reduced measurement time, risk and personnel exposure. An often stated advantage of burnup verification systems based on active/passive neutron measurements is that they can measure assembly burnup independent of fuel assembly records of initial enrichment, fuel assembly history and discharge time. However, as described previously, conventional systems rely on cadmium-shielded fission chambers to detect both passive ($^{244}$Cm and $^{242}$Cm spontaneous fission) and active (fission-multiplied neutrons from a $^{252}$Cf or $^{341}$Am/Be source) neutrons. Accuracy in positioning is a key to the overall accuracy of active/passive neutron assembly burnup measurements, because large neutron flux gradients exist in the vicinity of the fuel assembly.

The present detection system again offers distinct advantages over the conventional systems. For example, SiC neutron detectors are much more compact and simpler to operate than $^{235}$U fission chambers and, therefore, can be positioned more accurately. In addition, stringers or arrays of miniature semiconductor detectors can be used to define radial gradients and to provide simultaneous measurements at key axial positions to define the assembly burnup profile. The present burnup verification system offers the advantages of improved accuracy, system simplicity, reduced measurement time and reduced risk when compared with the systems presently in use.

While particular embodiments of the invention have been disclosed herein, it is to be understood that various modifications, changes, additions and adaptations may be made without departing from the scope of the present invention, as set forth in the following claims.

What is claimed is:

1. A system for measuring neutron and gamma emissions comprising:
    a source of neutron and gamma emissions; and
    at least one detector positioned to receive the neutron and gamma emissions from the source, the at least one detector comprising a semiconductor active region for generating an electronic signal in response to the neutron and gamma emissions from the source.

2. The system of claim 1, wherein the source of neutron and gamma emissions comprises at least one nuclear fuel assembly.

3. The system of claim 2, wherein the at least one nuclear fuel assembly comprises spent nuclear fuel.

4. The system of claim 2, wherein the system comprises a detector array including a plurality of the detectors.

5. The system of claim 4, wherein the detector array comprises from 2 to about 100 of the detectors.

6. The system of claim 4, wherein the detector array comprises a string of the detectors.

7. The system of claim 6, wherein the string of detectors has a length up to about 150 inches.

8. The system of claim 4, wherein the at least one nuclear fuel assembly extends in an axial direction and the detector array is disposed along a substantial axial length of the at least one fuel assembly.

9. The system of claim 8, wherein the detector array comprises a string of from 2 to about 100 of the detectors.

10. The system of claim 8, wherein the detector array comprises a string of from about 4 to about 50 of the detectors.

11. The system of claim 8, further comprising means for measuring an axial burnup profile of the at least one fuel assembly.

12. The system of claim 4, wherein the system comprises a plurality of the nuclear fuel assemblies disposed in a rack and the detector array is located outside the rack of fuel assemblies.

13. The system of claim 4, wherein the system comprises a plurality of the nuclear fuel assemblies disposed in a rack and the detector array is located inside the rack of fuel assemblies.

14. The system of claim 1, wherein the semiconductor active region of the at least one detector comprises at least one material selected from the group consisting of SiC, Si, Ge, diamond, GaAs, GaP, PbO, PbBr$_2$, PbI$_2$, CdS, CdTe and CdZnTe.

15. The system of claim 1, wherein the semiconductor active region of the at least one detector comprises SiC.

16. The system of claim 1, wherein the at least one detector measures the neutron emissions and the gamma emissions simultaneously.

17. The system of claim 1, further comprising means for distinguishing between the neutron emissions and gamma emissions measured by the at least one detector based on pulse height of the electronic signal.

18. The system of claim 1, wherein the at least one detector operates in a zero bias mode.

19. A method of measuring neutron and gamma emissions comprising:
    providing a source of neutron and gamma emissions; and
    positioning at least one detector to receive the neutron and gamma emissions from the source, the at least one detector comprising a semiconductor active region for generating an electronic signal in response to the neutron and gamma emissions from the source.

20. The method of claim 19, wherein the source of neutron and gamma emissions comprises at least one nuclear fuel assembly.

21. The method of claim 20, wherein the at least one nuclear fuel assembly comprises spent nuclear fuel.

22. The method of claim 20, further comprising providing at least one detector array including a plurality of the detectors.

23. The method of claim 22, wherein the detector array comprises from 2 to about 100 of the detectors.

24. The method of claim 22, wherein the detector array comprises a string of the detectors.

25. The method of claim 24, wherein the string of detectors has a length up to about 150 inches.

26. The method of claim 22, wherein the at least one nuclear fuel assembly extends in an axial direction and the detector array is disposed along a substantial axial length of the at least one fuel assembly.

27. The method of claim 26, wherein the detector array comprises a string of from 2 to about 100 of the detectors.

28. The method of claim 26, wherein the detector array comprises a string of from about 4 to about 50 of the detectors.

29. The method of claim 26, further comprising measuring an axial burnup profile of the at least one fuel assembly.

30. The method of claim 22, wherein the source of neutron and gamma emissions comprises a plurality of the nuclear fuel assemblies disposed in a rack and the detector array is located outside the rack of fuel assemblies.

31. The method of claim 22, wherein the source of neutron and gamma emissions comprises a plurality of the nuclear fuel assemblies disposed in a rack and the detector array is located inside the rack of fuel assemblies.

32. The method of claim 19, wherein the semiconductor active region of the at least one detector comprises at least one material selected from the group consisting of SiC, Si, Ge, diamond, GaAs, GaP, PbO, $PbBr_2$, $PbI_2$, CdS, CdTe and CdZnTe.

33. The method of claim 19, wherein the semiconductor active region of the at least one detector comprises SiC.

34. The method of claim 19, further comprising measuring the neutron emissions and gamma emissions with the at least one detector simultaneously.

35. The method of claim 19, further comprising distinguishing between the neutron emissions and gamma emissions measured by the at least one detector based on pulse height of the electronic signal.

36. The method of claim 19, further comprising operating the at least one detector in a zero bias mode.

37. A detector for measuring neutron and gamma emissions comprising a semiconductor active region for generating an electronic signal in response to neutron and gamma emissions received by the detector.

38. The detector of claim 37, wherein the semiconductor active region comprises at least one material selected from the group consisting of SiC, Si, Ge, diamond, GaAs, GaP, PbO, $PbBr_2$, $PbI_2$, CdS, CdTe and CdZnTe.

39. The detector of claim 37, wherein the semiconductor active region comprises SiC.

40. The detector of claim 37, wherein the detector measures neutron and gamma emissions simultaneously.

41. The detector of claim 37, further comprising means for distinguishing between the neutron emissions and gamma emissions based on pulse height of the electronic signal.

42. The detector of claim 37, wherein the detector operates in zero bias mode.

43. The detector of claim 37, wherein the neutron and gamma emissions are from spent nuclear fuel.

44. A detector array for measuring neutron and gamma emissions comprising a plurality of detectors having a semiconductor active region for generating an electronic signal in response to neutron and gamma emissions received by the detector.

45. The detector array of claim 44, wherein the detector array comprises from 2 to about 100 of the detectors.

46. The detector array of claim 44, wherein the detector array comprises a string of the detectors.

47. The detector array of claim 46, wherein the string of detectors has a length of up to about 150 inches.

48. The detector array of claim 44, wherein the detector array is structured for placement adjacent spent nuclear fuel for measuring neutron and gamma emissions from the spent nuclear fuel.

49. The detector array of claim 48, wherein the spent nuclear fuel comprises at least one fuel assembly extending in an axial direction and the detector array is structured for placement along a substantial axial length of the at least one fuel assembly.

50. The detector array of claim 49, wherein the detector array comprises means for measuring an axial burnup profile of the at least one fuel assembly.

* * * * *